US012629783B2

(12) United States Patent
Yamayoshi et al.

(10) Patent No.: US 12,629,783 B2
(45) Date of Patent: May 19, 2026

(54) ALUMINUM ALLOY BRAZING SHEET

(71) Applicant: UACJ Corporation, Tokyo (JP)

(72) Inventors: Tomoki Yamayoshi, Tokyo (JP);
Hidetoshi Kumagai, Tokyo (JP); **Shogo
Yamada, Kariya (JP); Nobuhiro
Homma, Kariya (JP); Taro Fukuda**,
Kariya (JP); Yosuke Uchida, Kariya
(JP)

(73) Assignee: UACJ CORPORATION, Tokyo (JP)

( * ) Notice: Subject to any disclaimer, the term of this
patent is extended or adjusted under 35
U.S.C. 154(b) by 0 days.

(21) Appl. No.: 18/846,319

(22) PCT Filed: Feb. 13, 2023

(86) PCT No.: PCT/JP2023/004694
§ 371 (c)(1),
(2) Date: Sep. 12, 2024

(87) PCT Pub. No.: WO2023/181697
PCT Pub. Date: Sep. 28, 2023

(65) Prior Publication Data
US 2025/0205830 A1     Jun. 26, 2025

(30) Foreign Application Priority Data
Mar. 23, 2022    (JP) ................................. 2022-047157

(51) Int. Cl.
B23K 35/00        (2006.01)
B23K 35/02        (2006.01)
(Continued)

(52) U.S. Cl.
CPC ........ B23K 35/0238 (2013.01); B23K 35/286
(2013.01); C22C 21/02 (2013.01)

(58) Field of Classification Search
CPC ............ B23K 35/0233; B23K 35/0238; B23K
35/286; B23K 35/383; B23K 2101/14;
(Continued)

(56) References Cited

U.S. PATENT DOCUMENTS 10,857,629 B2 * 12/2020 Fukumoto ............... C22C 21/00
11,654,516 B2 * 5/2023 Chehab ................. F28F 21/084
228/235.2
(Continued)

FOREIGN PATENT DOCUMENTS

CN        104357714 A  *  2/2015  ............... C22C 1/03
CN        104520061 B   *  8/2017  ............. C22C 21/14
(Continued)

OTHER PUBLICATIONS

International Search Report dated Apr. 25, 2023, issued in counter-
part International Application No. PCT/JP2023/004694, with Eng-
lish translation. (5 pages).
(Continued)

*Primary Examiner* — Kiley S Stoner
(74) *Attorney, Agent, or Firm* — WHDA, LLP

(57)                ABSTRACT

Provided is an aluminum alloy brazing sheet in which a first
cladding material/a first internal brazing material/core mate-
rial are stacked in this order, the aluminum alloy brazing
sheet is used for brazing in an inert gas atmosphere without
using a flux, the first internal brazing material is formed of
an aluminum alloy comprising 6.00 mass % to 13.00 mass
% of Si, more than 0.50 mass % and 4.50 mass % or less of
Mg, and 0.010 mass % to 0.50 mass % of Bi, and formed
with the balance being Al and inevitable impurities, and the
first cladding material is formed of an aluminum alloy
comprising 6.00 mass % to 13.00 mass % of Si and more
than 0.050 mass % and 0.50 mass % or less of Mg, having
a Bi content of 1.00 mass % or less, and formed with the
(Continued)

balance being Al and inevitable impurities. According to the present invention, an aluminum alloy brazing sheet having excellent brazeability in brazing in an inert gas atmosphere without using a flux can be provided.

19 Claims, 2 Drawing Sheets

(51) Int. Cl.
   *B23K 35/28* (2006.01)
   *C22C 21/02* (2006.01)
(58) Field of Classification Search
   CPC .. B23K 1/0008; B23K 1/0012; B23K 1/0014; C22C 21/02; C22C 21/00; F28F 21/089; F28F 19/06; B32B 15/016
   USPC .................................. 228/56.3, 245–246, 183
   See application file for complete search history.

(56) References Cited

U.S. PATENT DOCUMENTS

| | | | | |
|---|---|---|---|---|
| 2010/0151273 A1* | 6/2010 | Wittebrood | ............. C22C 21/02 | 428/650 |
| 2011/0111254 A1* | 5/2011 | Wittebrood | ............. C22C 21/02 | 228/221 |
| 2011/0198392 A1* | 8/2011 | Wittebrood | .......... B23K 35/286 | 228/200 |
| 2011/0204124 A1* | 8/2011 | Wittebrood | .......... B23K 1/0012 | 228/219 |
| 2012/0177947 A1* | 7/2012 | Abrahamsson | ......... C22C 21/02 | 428/654 |
| 2014/0246483 A1* | 9/2014 | Wittebrood | ........ B23K 35/0238 | 204/192.15 |
| 2015/0037607 A1* | 2/2015 | Itoh | .......................... C22C 21/00 | 428/654 |
| 2015/0118517 A1* | 4/2015 | Itoh | ......................... B32B 15/01 | 428/654 |
| 2015/0165564 A1* | 6/2015 | Ahl | ...................... B23K 35/286 | 228/101 |
| 2018/0200842 A1* | 7/2018 | Itoh | ......................... B23K 35/22 | |
| 2019/0077119 A1* | 3/2019 | Jacoby | .................. F28F 21/084 | |
| 2019/0337074 A1* | 11/2019 | Miyake | ................. B32B 15/016 | |
| 2020/0086428 A1* | 3/2020 | Miyake | ................... C22C 21/02 | |
| 2020/0086429 A1* | 3/2020 | Baumann | .............. F28F 21/084 | |
| 2021/0039207 A1* | 2/2021 | Ide | ........................... C22C 21/12 | |
| 2022/0040803 A1* | 2/2022 | Yamayoshi | ........ B23K 35/0238 | |
| 2023/0032540 A1* | 2/2023 | Jarry | .................... B23K 35/286 | |
| 2023/0234172 A1* | 7/2023 | Matsukado | ........ B23K 35/0238 | 428/654 |
| 2024/0316667 A1* | 9/2024 | Ide | ........................... C22F 1/043 | |
| 2025/0083205 A1* | 3/2025 | Yanagawa | ............... B21B 1/222 | |
| 2025/0128360 A1* | 4/2025 | Kumagai | ................ C22C 21/02 | |
| 2025/0178132 A1* | 6/2025 | Yamayoshi | ............. C22C 21/00 | |
| 2025/0205830 A1* | 6/2025 | Yamayoshi | .......... B23K 35/383 | |

FOREIGN PATENT DOCUMENTS

| | | | | | |
|---|---|---|---|---|---|
| CN | 112626380 | A | * | 4/2021 | ............. C22C 1/026 |
| CN | 110947762 | B | * | 8/2021 | ............. C22C 1/026 |
| CN | 115052706 | A | * | 9/2022 | .......... B23K 1/0012 |
| DE | 12728629 | T1 | * | 6/2014 | .............. F28F 3/025 |
| EP | 2803442 | B1 | * | 10/2018 | .......... B23K 35/286 |
| EP | 3176273 | B1 | * | 12/2018 | ............. C22C 21/02 |
| EP | 3261797 | B1 | * | 7/2019 | .......... B23K 35/286 |
| EP | 3197632 | B1 | * | 8/2019 | .......... B32B 15/016 |
| EP | 3859023 | A1 | * | 8/2021 | ............. C22C 21/06 |
| EP | 3875211 | A1 | * | 9/2021 | .......... B32B 15/016 |
| EP | 3925728 | A1 | * | 12/2021 | ............. C22C 21/02 |
| EP | 3972775 | B1 | * | 8/2024 | ............. C22C 21/02 |
| JP | H05337681 | A | * | 12/1993 | .......... F28F 21/084 |
| JP | H10-180489 | A | | 7/1998 | |
| JP | 2014-037576 | A | | 2/2014 | |
| JP | 2017018996 | A | * | 1/2017 | ............. C22C 21/00 |
| JP | 2018103260 | A | * | 7/2018 | ............. C22C 21/02 |
| WO | WO-2011034496 | A2 | * | 3/2011 | .......... F28F 21/089 |
| WO | WO-2013180630 | A1 | * | 12/2013 | .......... F28F 21/089 |
| WO | 2016/056306 | A1 | | 4/2016 | |
| WO | 2017/010287 | A1 | | 1/2017 | |
| WO | WO-2017080771 | A1 | * | 5/2017 | .......... B23K 35/286 |
| WO | 2018/123203 | A1 | | 7/2018 | |
| WO | 2020/204168 | A1 | | 10/2020 | |
| WO | WO-2023074289 | A1 | * | 5/2023 | .......... B23K 35/286 |

OTHER PUBLICATIONS

Written Opinion dated Apr. 25, 2023, issued in counterpart International Application No. PCT/JP2023/004694. (3 pages).

\* cited by examiner

ALUMINUM ALLOY BRAZING SHEET

TECHNICAL FIELD

The present invention relates to an aluminum alloy brazing sheet used for brazing in an inert gas atmosphere without using a flux.

BACKGROUND ART

For aluminum heat exchangers and mechanical components, brazing techniques that can simultaneously joint many joint parts are widely used. Aluminum is quickly covered with a dense oxide film because aluminum has highly oxidizable properties. Consequently, while aluminum has excellent corrosion resistance, the joint is difficult to achieve. Therefore, in aluminum brazing, it is important to inhibit the growth of a surface oxide film and to break the film. Two major methods are in practical use, that is, a method for heating in vacuum without using a flux and a method for using a flux in nitrogen gas.

In the method for heating in vacuum without using the flux, a brazing material formed of an Al—Si—Mg-based alloy is used. Brazing can be performed by raising temperature in a vacuum to prevent the growth of an oxide film caused by Al and Mg and breaking the oxide film on the material surface due to the evaporation of Mg during melting of a brazing substance. However, this method has the disadvantage of requiring expensive vacuum heating equipment. In addition, there is a problem of a high maintenance cost for removing attached Mg because the evaporated Mg is attached to the inside of a furnace.

On the other hand, in the method for using the flux in nitrogen gas, a brazing material formed of an Al—Si-based alloy and a flux formed of an Al—K—F-based alloy are used. Even in a nitrogen gas atmosphere, which has a higher oxygen concentration than that in vacuum, the melted flux strongly breaks the oxide film on the brazing material surface while preventing the growth of the oxide film on the brazing material surface and thus brazing can be performed. While this method does not require the expensive vacuum heating equipment, there is a problem of the cost of the flux and the high cost of a flux application process. In addition, there are concerns of health and safety and environmental problems when the flux is scattered into the work environment due to evaporation during application to the heat exchanger or during brazing.

Therefore, there are growing needs for jointing without using the flux in an inert gas atmosphere.

To satisfy these needs, for example, Patent Literature 1 has suggested that brazing of a close contact part can be achieved by comprising Mg and Bi in the brazing material and treating the material with an inorganic acid. Although materials comprising Mg in the brazing material cannot be brazed due to the formation of MgO during a heat treatment process in the material production, the brazing can be performed by removing MgO with treatment using the inorganic acid.

In addition, Patent Literature 2 has suggested that brazing can be performed by regulating the amount of Mg in the brazing material and diffusing Mg comprised in the core material during the brazing. Due to the absence of Mg in the brazing material, it is advantageous in that the formation of MgO during material production and during brazing temperature rise is prevented.

On the other hand, Patent Literature 3 has suggested that cladding of an intermediate layer having a high Mg concentration between the brazing material and the core material allows the supply amount of Mg to the brazing material to be increased without adding Mg to the brazing material, and thus the oxide film to be efficiently broken to some extent.

CITATION LIST

Patent Literature

Patent Literature 1: Japanese Patent Publication H10-180489A

Patent Literature 2: Japanese Patent Publication 2014-037576-A

Patent Literature 3: WO 2016/056306

SUMMARY OF INVENTION

Technical Problem

However, in Cited Literature 1, MgO grows even during the brazing temperature rise and thus the material surface is covered with a thick oxide film. Therefore, there arises a problem in that sufficient fillets cannot be formed in practical joints having large clearances.

In Cited Literature 2, the amount of Mg that can be added to the core material is limited due to formability and other restrictions and thus brazing heating at high temperature for a long period of time is required to diffuse Mg in the core material into the oxide film. Therefore, in the case of a practical brazing atmosphere, there arises a problem in that the brazing at high temperature for a long period of time accelerates oxidation of aluminum itself and thus the growth of a thick oxide film occurs, resulting in significant deterioration in brazeability.

In addition, Cited Literature 3 has not solved a problem in that the oxide film break non-uniformly progresses, and has not reached a practical level.

Therefore, an object of the present invention is to provide an aluminum alloy brazing sheet having excellent brazeability in brazing in an inert gas atmosphere without using a flux.

Solution to Problem

As a result of intensive studies for solving the above problems, the inventors of the present invention have found that a brazing material (internal brazing material) comprising a predetermined amounts of Mg and Bi and a cladding material layer comprising a predetermined amount of Mg placed outside of the brazing material are provided, whereby excellent brazeability is provided in brazing in an inert gas atmosphere without using a flux, and thus have accomplished the present invention.

That is, the present invention (1) provides an aluminum alloy brazing sheet comprising:

a core material formed of pure aluminum or an aluminum alloy; and a first first internal brazing material and a first first cladding material cladded on at least one side surface of the core material in order of first first cladding material/ first first internal brazing material/core material, the aluminum alloy brazing sheet being used for brazing in an inert gas atmosphere without using a flux, in which the first first internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and the first cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

In addition, the present invention (2) provides the aluminum alloy brazing sheet according to (1), further comprising a first sacrificial anode material cladded on another side surface of the core material in order of first cladding material/first internal brazing material first internal brazing material/core material/first sacrificial anode material, in which the first sacrificial anode material is formed of an aluminum alloy comprising any one or more of 5.00 mass % or less of Si, 1.50 mass % or less of Fe, 2.00 mass % or less of Cu, 2.00 mass % or less of Mn, 3.00 mass % or less of Mg, 6.00 mass % or less of Zn, 0.30 mass % or less of Cr, 0.30 mass % or less of Ti, and 0.30 mass % or less of Zr, and formed with the balance being Al and inevitable impurities.

In addition, the present invention (3) provides the aluminum alloy brazing sheet according to (1), further comprising an outer surface brazing material cladded on another side surface of the core material in order of first cladding material/first internal brazing material first internal brazing material/core material/outer surface brazing material, in which the outer surface brazing material is formed of an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

In addition, the present invention (4) provides the aluminum alloy brazing sheet according to (2), further comprising an outer surface brazing material cladded on a surface of the first sacrificial anode material on an opposite side to the core material in order of first cladding material/first internal brazing material first internal brazing material/core material/first sacrificial anode material/outer surface brazing material, in which the outer surface brazing material is formed of an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

In addition, the present invention (5) provides the aluminum alloy brazing sheet according to (2), further comprising an second internal brazing material and a second cladding material cladded on a surface of the first sacrificial anode material on an opposite side to the core material in order of first cladding material/first internal brazing material first internal brazing material/core material/first sacrificial anode material/second internal brazing material/second cladding material, in which the second internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and the second cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

In addition, the present invention (6) provides the aluminum alloy brazing sheet according to (1), further comprising an second internal brazing material and a second cladding material cladded on another side surface of the core material in order of first cladding material/first internal brazing material first internal brazing material/core material/second internal brazing material/second cladding material, in which the second internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and the second cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

In addition, the present invention (7) provides an aluminum alloy brazing sheet comprising:

a core material formed of pure aluminum or an aluminum alloy; and a second sacrificial anode material, an first internal brazing material first internal brazing material, and a first cladding material cladded on at least one side surface of the core material in order of first cladding material/first internal brazing material first internal brazing material/ second sacrificial anode material/core material, the aluminum alloy brazing sheet being used for brazing in an inert gas atmosphere without using a flux, in which the first internal brazing material first internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi and formed with the balance being Al and inevitable impurities, the first cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities, and the second sacrificial anode material comprises any one or more of 5.00 mass % or less of Si, 1.50 mass % or less of Fe, 2.00 mass % or less of Cu, 2.00 mass % or less of Mn, 3.00 mass % or less of Mg, 6.00 mass % or less of Zn, 0.30 mass % or less of Cr, 0.30 mass % or less of Ti, and 0.30 mass % or less of Zr, and is formed with the balance being Al and inevitable impurities.

In addition, the present invention (8) provides the aluminum alloy brazing sheet according to (7), further comprising a third sacrificial anode material cladded on another side surface of the core material in order of first cladding material/first internal brazing material first internal brazing material/second sacrificial anode material/core material/third sacrificial anode material, in which the third sacrificial anode material is an aluminum alloy comprising any one or more of 5.00 mass % or less of Si, 1.50 mass % or less of Fe, 2.00 mass % or less of Cu, 2.00 mass % or less of Mn, 3.00 mass % or less of Mg, 6.00 mass % or less of Zn, 0.30 mass % or less of Cr, 0.30 mass % or less of Ti, and 0.30 mass % or less of Zr, and formed with the balance being Al and inevitable impurities.

In addition, the present invention (9) provides the aluminum alloy brazing sheet according to (7), further comprising an outer surface brazing material cladded on another side surface of the core material in order of first cladding material/first internal brazing material first internal brazing material/second sacrificial anode material/core material/outer surface brazing material, in which the outer surface brazing material is an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

In addition, the present invention (10) provides the aluminum alloy brazing sheet according to (8), further comprising an outer surface brazing material cladded on a surface of the sacrificial anode material B2 on an opposite side to the core material in order of first cladding material/first internal brazing material first internal brazing material/second sacrificial anode material/core material/third sacrificial anode material/outer surface brazing material, in which the outer surface brazing material is an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

In addition, the present invention (11) provides the aluminum alloy brazing sheet according to (8), further comprising an second internal brazing material and a second cladding material cladded on a surface of the sacrificial anode material B2 on an opposite side to the core material in order of first cladding material/first internal brazing material first internal brazing material/second sacrificial anode material/core material/third sacrificial anode material/second internal brazing material/second cladding material, in which the second internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and the second cladding material is formed of an aluminum alloy comprising 6.00 mass % to 13.00 mass % of Si, more than 0.050 mass % and 0.50 mass % or less of Mg, having a Bi content of 1.00 mass % or less, and formed with the balance being Al and inevitable impurities.

In addition, the present invention (12) provides the aluminum alloy brazing sheet according to (7), further comprising an second internal brazing material and a second cladding material cladded on another side surface of the core material in order of first cladding material/first internal brazing material first internal brazing material/second sacrificial anode material/core material/second internal brazing material/second cladding material, in which the second internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and the second cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

In addition, the present invention (13) provides the aluminum alloy brazing sheet according to any one of (1) to (12), in which the core material is formed of an aluminum alloy comprising any one or more of 1.50 mass % or less of Si, 1.50 mass % or less of Fe, 2.00 mass % or less of Cu, 2.00 mass % or less of Mn, 3.00 mass % or less of Mg, 3.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

In addition, the present invention (14) provides the aluminum alloy brazing sheet according to any one of (1) to (13), in which the first internal brazing material first internal brazing material or the second internal brazing material further comprises any one or more of 1.00 mass % or less of Fe, 2.00 mass % or less of Cu, 2.00 mass % or less of Mn, 6.00 mass % or less of Zn, 0.30 mass % or less of Cr, 0.30 mass % or less of Ti, and 0.30 mass % or less of Zr.

In addition, the present invention (15) provides the aluminum alloy brazing sheet according to any one of (1) to (14), in which the first cladding material or the second cladding material further comprises any one or more of 1.00 mass % or less of Fe, 2.00 mass % or less of Cu, 2.00 mass % or less of Mn, 6.00 mass % or less of Zn, 0.30 mass % or less of Cr, 0.30 mass % or less of Ti, and 0.30 mass % or less of Zr.

In addition, the present invention (16) provides the aluminum alloy brazing sheet according to any one of (1) to (15), in which a thickness of the first cladding material or the second cladding material is 5.0 μm or more.

In addition, the present invention (17) provides the aluminum alloy brazing sheet according to any one of (1) to (16), in which a thickness of the first internal brazing material first internal brazing material or the second internal brazing material is 15.0 μm or more.

In addition, the present invention (18) provides the aluminum alloy brazing sheet according to any one of (1) to (17), in which an average Mg concentration in a thickness direction of the first internal brazing material first internal brazing material and the first cladding material is more than 0.50 mass % and an average Bi concentration in the thickness direction of the first internal brazing material first internal brazing material and the first cladding material is more than 0.050 mass %.

In addition, the present invention (19) provides the aluminum alloy brazing sheet according to any one of (1) to (18), in which an average Mg concentration in the thickness direction of the first internal brazing material first internal brazing material and the first cladding material or the second internal brazing material and the second cladding material is more than 0.50 mass % and an average Bi concentration in the thickness direction of the first internal brazing material first internal brazing material and the first cladding material or the second internal brazing material and the second cladding material is more than 0.050 mass %.

Advantageous Effect of Invention

According to the present invention, an aluminum alloy brazing sheet having excellent brazeability in brazing in an inert gas atmosphere without using a flux can be provided.

DESCRIPTION OF EMBODIMENTS

Figure 1:
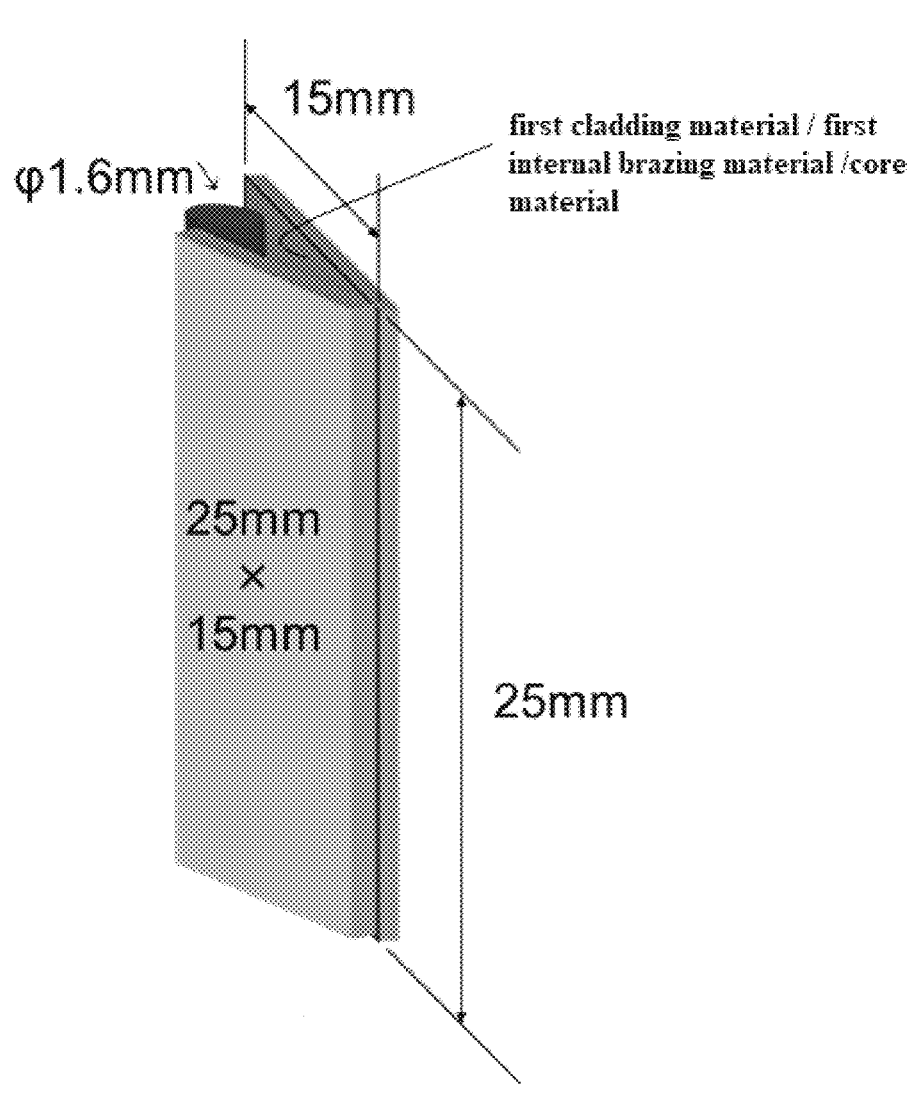
FIG. 1 is a view illustrating a test body of an overlapped opening-mouth test.

An aluminum alloy brazing sheet of a first embodiment of the present invention is an aluminum alloy brazing sheet comprising:

a core material formed of pure aluminum or an aluminum alloy; and an first internal brazing material first internal brazing material and a first cladding material cladded on at least one side surface of the core material in order of first cladding material/first internal brazing material first internal brazing material/core material, the aluminum alloy brazing sheet being used for brazing in an inert gas atmosphere without using a flux, in which the first internal brazing material first internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and the first cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

An aluminum alloy brazing sheet of a second embodiment of the present invention is an aluminum alloy brazing sheet comprising:

a core material formed of pure aluminum or an aluminum alloy; and a second sacrificial anode material, an first internal brazing material first internal brazing material, and a first cladding material cladded on at least one side surface of the core material in order of first cladding material/first internal brazing material first internal brazing material/second sacrificial anode material/core material, the aluminum alloy brazing sheet being used for brazing in an inert gas atmosphere without using a flux, in which the first internal brazing material first internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi and formed with the balance being Al and inevitable impurities, the first cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities, and the second sacrificial anode material comprises any one or more of 5.00 mass % or less of Si, 1.50 mass % or less of Fe, 2.00 mass % or less of Cu, 2.00 mass % or less of Mn, 3.00 mass % or less of Mg, 6.00 mass % or less of Zn, 0.30 mass % or less of Cr, 0.30 mass % or less of Ti, and 0.30 mass % or less of Zr, and is formed with the balance being Al and inevitable impurities.

In the production of aluminum alloy heat exchangers, the aluminum alloy brazing sheet of first embodiment of the present invention and the aluminum alloy brazing sheet of second embodiment of the present invention are brazing sheets brazed by forming into the shape of constituent members of the heat exchangers and brazing heating in an inert gas atmosphere without using a flux, that is, aluminum alloy brazing sheets for producing the aluminum alloy heat exchangers and aluminum alloy brazing sheets used in the production of the aluminum alloy heat exchangers by brazing in the inert gas atmosphere without using the flux.

The aluminum alloy brazing sheet of the first embodiment of the present invention comprises the first internal brazing material first internal brazing material and the first cladding material cladded on at least one side surface of the core material in order of first cladding material/first internal brazing material first internal brazing material/core material. In other words, the aluminum alloy brazing sheet of the first embodiment of the present invention comprises at least the first cladding material serving as an outermost layer on one side surface of the core material and the first internal brazing material first internal brazing material placed just under the first cladding material. In the aluminum alloy brazing sheet of the first embodiment of the present invention, no materials may be cladded or one or more materials for clad may be cladded on the other side surface of the core material, that is, the surface opposite to the side where the first internal brazing material first internal brazing material and the first cladding material are cladded. Examples of the form of the aluminum alloy brazing sheet of the first embodiment of the present invention include a three-layer material cladded by laminating in order of first cladding material/first internal brazing material first internal brazing material/core material, a four-layer material cladded by laminating in order of first cladding material/first internal brazing material first internal brazing material/core material/first sacrificial anode material, a four-layer material cladded by laminating in order of first cladding material/first internal brazing material first internal brazing material/core material/outer surface brazing material, a five-layer material cladded by laminating in order of first cladding material/first internal brazing material first internal brazing material/core material/first sacrificial anode material/outer surface brazing material, a five-layer material cladded by laminating in order of first cladding material/first internal brazing material first internal brazing material/core material/second internal brazing material/second cladding material, and a six-layer material cladded by laminating in order of first cladding material/first internal brazing material first internal brazing material/core material/first sacrificial anode material/second internal brazing material/second cladding material. In the case where the aluminum alloy brazing sheet of the first embodiment of the present invention comprises the second internal brazing material and the second cladding material in addition to the first internal brazing material first internal brazing material and the first cladding material, the first internal brazing material and the second internal brazing material may have the same chemical composition or different chemical compositions, and the first cladding material and the second cladding material may have the same chemical composition or different chemical compositions.

The aluminum alloy brazing sheet of the second embodiment of the present invention comprises the second sacrificial anode material, the first internal brazing material, and the first cladding material cladded by laminating in order of first cladding material/first internal brazing material/second sacrificial anode material/core material on at least one side surface of the core material. In other words, the aluminum alloy brazing sheet of the second embodiment of the present invention comprises the first cladding material serving as the outermost layer, the first internal brazing material placed just under the first cladding material, and the second sacrificial anode material placed just under the first internal brazing material on one side surface of the core material. In the aluminum alloy brazing sheet of the second embodiment of the present invention, no materials may be cladded or one or more materials for clad may be cladded on the other side surface of the core material, that is, the surface opposite to the side where the second sacrificial anode material, the first internal brazing material, and the first cladding material are cladded. Examples of the form of the aluminum alloy brazing sheet of the second embodiment of the present invention include a four-layer material cladded by laminating in order of first cladding material/first internal brazing material/second sacrificial anode material/core material, a five-layer material cladded by laminating in order of first cladding material/first internal brazing material/second sacrificial anode material/core material/third sacrificial anode material, a five-layer material cladded by laminating in order of first cladding material/first internal brazing material/second sacrificial anode material/core material/outer surface brazing material, a six-layer material cladded by laminating in order of first cladding material/first internal brazing material/second sacrificial anode material/core material/third sacrificial anode material/outer surface brazing material, a six-layer material cladded by laminating in order of first cladding material/first internal brazing material/second sacrificial anode material/core material/second internal brazing material/second cladding material, and a seven-layer material cladded by laminating in order of first cladding material/first internal brazing material/second sacrificial anode material/core material/third sacrificial anode material/second internal brazing material/second cladding material. In the case where the aluminum alloy brazing sheet of the second embodiment of the present invention comprises the third sacrificial anode material in addition to the second sacrificial anode material, the second sacrificial anode material and the third sacrificial anode material may have the same chemical composition or different chemical compositions. In the case where the aluminum alloy brazing sheet of the second embodiment of the present invention comprises the second internal brazing material and the second cladding material in addition to the first internal brazing material and the first cladding material, the first internal brazing material and the second internal brazing material may have the same chemical composition or different chemical compositions, and the first cladding material and the second cladding material may have the same chemical composition or different chemical compositions.

The core material according to the aluminum alloy brazing sheet of the first embodiment of the present invention and the core material according to the aluminum alloy brazing sheet of the second embodiment of the present invention are similar. The first cladding material and the second cladding material according to the aluminum alloy brazing sheet of the first embodiment of the present invention and the first cladding material and the second cladding material according to the aluminum alloy brazing sheet of the second embodiment of the present invention are similar. The first internal brazing material according to the aluminum alloy brazing sheet of the first embodiment of the present invention and the first internal brazing material according to the aluminum alloy brazing sheet of the second embodiment of the present invention are similar. The first sacrificial anode material according to the aluminum alloy brazing sheet of the first embodiment of the present invention and the second sacrificial anode material and the third sacrificial anode material according to the aluminum alloy brazing sheet of the second embodiment of the present invention are similar. The outer surface brazing material according to the aluminum alloy brazing sheet of the first embodiment of the present invention and the outer surface brazing material according to the aluminum alloy brazing sheet of the second embodiment of the present invention are similar. The second internal brazing material according to the aluminum alloy brazing sheet of the first embodiment of the present invention and the second internal brazing material according to the aluminum alloy brazing sheet of the second embodiment of the present invention are similar.

The core materials according to the aluminum alloy brazing sheet of the first embodiment of the present invention and the aluminum alloy brazing sheet of the second embodiment of the present invention are formed of pure aluminum or an aluminum alloy.

In the case where the core material is formed of pure aluminum, the purity of the pure aluminum is not particularly limited and is preferably 99.0 mass % or more and particularly preferably 99.5 mass % or more. Examples of the pure aluminum materials include A1100, A1050, and A1080.

In the case where the core material is formed of the aluminum alloy, the composition of the aluminum alloy forming the core material is not particularly limited as long as the aluminum alloy can be used as the core material of the aluminum alloy brazing sheet for producing the aluminum alloy heat exchangers. As the core material, a core material formed of an aluminum alloy comprising any one or more of 1.50 mass % or less of Si, 1.50 mass % or less of Fe, 2.00 mass % or less of Cu, 2.00 mass % or less of Mn, 3.00 mass % or less of Zn, 0.30 mass % or less of Cr, 0.30 mass % or less of Ti, and 0.30 mass % or less of Zr, and formed with the balance being Al and inevitable impurities is preferable.

In the core material of the aluminum alloy, Si contributes to strength enhancement. In the case where the core material comprises Si, the Si content in the core material is 1.50 mass % or less and preferably 0.10 mass % to 1.00 mass %. The Si content in the core material within the above range allows the strength of the core material to be improved. On the other hand, a Si content in the core material of more than the above range causes the melting point to become excessively low, local melting to occur during brazing, and deformation of the core material to occur, resulting in lower corrosion resistance.

Fe contributes to strength enhancement. In the case where the core material comprises Fe, the Fe content in the core material is 1.50 mass % or less and preferably 0.10 mass % to 0.70 mass %. The Fe content in the core material within the above range allows the strength of the core material to be improved. On the other hand, a Fe content in the core material of more than the above range causes corrosion resistance to deteriorate and giant compounds to be easily generated.

Cu contributes to strength enhancement and potential adjustment. In the case where the core material comprises Cu, the Cu content in the core material is 2.00 mass % or less and preferably 0.10 mass % to 1.00 mass %. The Cu content in the core material within the above range allows the strength of the core material to be improved. On the other hand, a Cu content in the core material of more than the above range causes intergranular corrosion to easily occur and the melting point to be excessively low.

Mn contributes to strength enhancement and potential adjustment. In the case where the core material comprises Mn, the Mn content in the core material is 2.00 mass % or less and preferably 0.30 mass % to 1.80 mass %. The Mn content in the core material within the above range allows the strength of the core material to be improved and a potential adjustment effect to be achieved. On the other hand, a Mn content in the core material of more than the above range causes cracks to be easily generated during material rolling.

Zn contributes to potential adjustment. In the case where the core material comprises Zn, the Zn content in the core material is 3.00 mass % or less and preferably 0.50 mass % to 3.00 mass %. The Zn content in the core material within the above range allows the potential adjustment effect to be achieved. On the other hand, a Zn content in the core material of more than the above range causes natural electrode potential to be excessively low, resulting in lower corrosion resistance.

Cr improves strength by solid solution strengthening, also precipitates fine Al—Cr-based compounds, and acts on coarsening grains after brazing. The Cr content in the core material is 0.30 mass % or less and preferably 0.10 mass % to 0.20 mass %. The Cr content in the core material within the above range allows the strength of the core material to be improved. On the other hand, a Cr contents in the core material of more than the above range causes giant intermetallic compounds to be easily formed during casting and thus plastic workability to deteriorate.

Ti improves strength by solid solution strengthening, and is distributed in layers to form high and low potential layers in the core material, whereby the corrosion form changes from pitting corrosion to layer corrosion to exhibit the effect of improving corrosion resistance. The Ti content in the core material is 0.30 mass % or less and preferably 0.10 mass % to 0.20 mass %. The Ti content in the core material within the above range allows the strength of the core material to be improved and corrosion resistance to be improved. On the other hand, a Ti content in the core material of more than the above range may cause giant intermetallic compound to be easily formed during casting and thus plastic workability to deteriorate.

Zr improves strength by solid solution strengthening, also precipitates Al—Zr-based fine compounds, and acts on coarsening grains after brazing. The Zr content in the core material is 0.30 mass % or less and preferably 0.10 mass % to 0.20 mass %. The Zr content in the core material within the above range allows the strength of the core material to be improved and the effect of coarsening grains after brazing to be achieved. On the other hand, a Zr content in the core material of more than the above range causes giant intermetallic compounds to be easily formed during casting and thus plastic workability to deteriorate.

The core material may comprise Mg. In the core material of the aluminum alloy, Mg diffuses into the first internal brazing material or the first cladding material during brazing heating, promotes the breaking of the oxide film on the material surface, and contributes to improving brazeability. In the case where the core material comprises Mg, the Mg content in the core material is 3.00 mass % or less and preferably 0.30 mass % to 1.80 mass %. The Mg content in the core material within the above range allows the effect of brazeability improvement to be easily achieved. On the other hand, a Mg content in the core material of more than the above range causes cracks to be easily generated during material rolling.

The core material may comprise Bi. In aluminum alloys forming the core material, in the case where Bi causes a part of the core material to melt by melting the first internal brazing material or the first cladding material during brazing heating, Bi acts to reduce the decrease in the Bi concentration in the first internal brazing material or the first cladding material and exhibits the promoting action for breaking of the oxide film due to Mg. In the case where the core martial comprises Bi, the Bi content in the core material is 0.50 mass % or less and preferably 0.10 mass % to 0.40 mass %. The Bi content in the core material within the above range allows the action of promoting the breaking of the oxide film due to Mg to be achieved. On the other hand, a Bi content of more than the above range causes cracks to be easily generated during material production and thus production of the brazing sheet to be difficult.

The core material may comprise 0.050 mass % or less of Ag, B, Be, Ca, Cd, Co, Ga, Ge, Hg, In, Li, Mo, Na, Ni, P, Pb, Sb, Sn, Sr, V, and Y as unavoidable impurities.

The first internal brazing material and the second internal brazing material according to the aluminum alloy brazing sheet of the first embodiment of the present invention and the aluminum alloy brazing sheet of the second embodiment of the present invention are formed of an aluminum alloy comprising 6.00 mass % to 13.00 mass % Si, more than 0.50 mass % and 4.50 mass % or less of Mg, and 0.010 mass % to 0.50 mass % of Bi, and formed with the balance being Al and inevitable impurities.

The first internal brazing material and the second internal brazing material comprise Si. In the aluminum alloy brazing material, Si contributes to brazing jointability. The Si contents in the first internal brazing material and the second internal brazing material are 6.00 mass % to 13.00 mass %. The Si contents in the first internal brazing material and the second internal brazing material within the above range allow the sufficient brazing jointability to be obtained. Si contents in the first internal brazing material and the second internal brazing material of less than the above range cause jointability to be inferior, whereas Si contents of more than the above range cause cracks to be easily generated during material production and thus the production of the brazing sheet to be difficult.

The first internal brazing material and the second internal brazing material comprise Mg. The Mg contents in the first internal brazing material and the second internal brazing material are more than 0.50 mass % and 4.50 mass % or less and preferably 0.60 mass % to 4.00 mass %. The Mg contents in the first internal brazing material and the second internal brazing material within the above range allow the sufficient brazing jointability to be obtained. Mg contents in the first internal brazing material and the second internal brazing material of the above range or less cause breaking effect of the oxide film to be inferior, whereas Si contents of more than the above range cause cracks to be easily generated during material production and thus the production of the brazing sheet to be difficult.

The first internal brazing material and the second internal brazing material comprise Bi. The Bi contents in the brazing material 1 and the second internal brazing material are 0.010 mass % to 0.50 mass % and preferably 0.020 mass % to 0.45 mass %. The Bi contents in the first internal brazing material and the second internal brazing material within the above range allow the sufficient brazing jointability to be obtained. Bi contents in the first internal brazing material and the second internal brazing material of less than the above range cause action of promoting the breaking effect of the oxide film due to Mg to be insufficient, whereas Bi contents of more than the above range cause cracks to be easily generated during material production and thus the production of the brazing sheet to be difficult.

The first internal brazing material and the second internal brazing material may comprise any one or more of Na, Sr, and Sb. In the aluminum alloy forming the brazing material, Na, Sr, and Sb exhibit the effect of forming fine Si particles in the brazing material and improving the fluidity of the brazing substance. In the case where the first internal brazing material and the second internal brazing material comprise Na, the Na contents are 0.050 mass % or less and preferably 0.005 mass % to 0.040 mass %. In the case where the first internal brazing material and the second internal brazing material comprise Sr, the Sr contents are 0.050 mass % or less, preferably 0.005 mass % to 0.040 mass %. In the case where the first internal brazing material and the second internal brazing material comprise Sb, the Sb contents are 0.050 mass % or less, preferably 0.005 mass % to 0.040 mass %. The contents of Na, Sr, and Sb in the first internal brazing material and the second internal brazing material within the above ranges allow the effect of forming fine Si particles to be achieved. On the other hand, contents of Na, Sr, and Sb in the first internal brazing material and the second internal brazing material of more than the above ranges cause the effect to be saturated, which is not economical.

The first internal brazing material and the second internal brazing material may comprise any one or two of Zn and Cu. In the aluminum alloy forming the first internal brazing material and the second internal brazing material, Zn and Cu decrease the melting points of the brazing materials and enable brazing at a temperature of lower than 600° C., which is a common brazing temperature.

In the case where the first internal brazing material and the second internal brazing material comprise Zn, the Zn contents are preferably 6.00 mass % or less, particularly preferably 1.00 mass % to 5.50 mass %, and further preferably 3.00 mass % to 5.00 mass % form the viewpoint of easily achieving the effect of lowering the melting point of the brazing material. On the other hand, Zn contents in the first internal brazing material and the second internal brazing material of more than the above range cause cracks to be generated during material production and thus the production of the brazing sheet to be difficult. In the case where the first internal brazing material and the second internal brazing material comprise Zn, the Zn contents in the first internal brazing material and the second internal brazing material are preferably 3.00 mass % or less from the viewpoint that the effect of preventing corrosion of the core material is easily achieved by setting the potential of the brazing materials less-noble and preferentially corroding the brazing materials against the core material.

In the case where the first internal brazing material and the second internal brazing material comprise Cu, the Cu contents are 2.00 mass % or less, preferably 0.50 mass % to 2.00 mass %, and particularly preferably 1.00 mass % to 2.00 mass %. The Cu contents in the first internal brazing material and the second internal brazing material within the above range allow the effect of lowering the melting point of the brazing material to be improved. On the other hand, Cu contents in the first internal brazing material and the second internal brazing material of more than the above range cause cracks to be generated during material production, and thus the production of the brazing sheet to be difficult.

The first internal brazing material and the second internal brazing material may comprise Fe. In the aluminum alloy forming the brazing material, Fe precipitates relatively coarse Al—Fe-based compounds and acts to form fine grains of the remaining brazing material after brazing. In the case where the first internal brazing material and the second internal brazing material comprise Fe, the Fe contents in the first internal brazing material and the second internal brazing material are 1.00 mass % or less and preferably 0.10 mass % to 0.50 mass %. The Fe contents in the first internal brazing material and the second internal brazing material within the above range allow the effect of forming fine grains to be easily achieved. On the other hand, Fe contents in the first internal brazing material and the second internal brazing material of more than the above range cause giant intermetallic compounds to be easily formed during casting and thus plastic workability to deteriorate.

The first internal brazing material and the second internal brazing material may comprise any one or more of Mn, Cr, Ti, and Zr. In the aluminum alloy forming the brazing material, Mn, Cr, Ti, and Zr precipitate Al—Mn-based, Al—Cr-based, Al—Ti-based, and Al—Zr-based fine compounds, respectively and act on coarsening grains of the remaining brazing material after brazing.

In the case where the first internal brazing material and the second internal brazing material comprise Mn, the Mn contents are 2.00 mass % or less and preferably 0.10 mass % to 0.60 mass %. The Mn contents in the first internal brazing material and the second internal brazing material within the above range allow the effect of coarsening grains to be easily achieved. On the other hand, Mn contents in the first internal brazing material and the second internal brazing material of more than the above range cause giant intermetallic compounds to be easily formed during casting and thus plastic workability to deteriorate.

In the case where the first internal brazing material and the second internal brazing material comprise Cr, the Cr contents are 0.30 mass % or less and preferably 0.10 mass % to 0.20 mass %. The Cr contents in the first internal brazing material and the second internal brazing material within the above range allow the effect of coarsening grains to be easily achieved. On the other hand, Cr contents in the first internal brazing material and the second internal brazing material of more than the above range cause giant intermetallic compounds to be easily formed during casting and thus plastic workability to deteriorate.

When the first internal brazing material and the second internal brazing material comprise Ti, the Ti contents are 0.30 mass % or less and preferably 0.10 mass % to 0.20 mass %. The Ti contents in the first internal brazing material and second internal brazing material within the above range allow the effect of coarsening grains to be easily achieved. On the other hand, Ti contents in the first internal brazing material and the second internal brazing material of more than the above range cause giant intermetallic compounds to be easily formed during casting and thus plastic workability to deteriorate.

In the case where the first internal brazing material and the second internal brazing material comprise Zr, the Zr contents are 0.30 mass % or less and preferably 0.10 mass % to 0.20 mass %. The Zr contents in the first internal brazing material and the second internal brazing material within the above range allow the effect of coarsening grains to be easily achieved. On the other hand, Zr contents in the first internal brazing material and the second internal brazing material of more than the above range cause giant intermetallic compounds to be easily formed during casting and thus plastic workability to deteriorate.

The grain size after brazing is adjusted by utilizing the above actions. The effects of the present invention can be sufficiently achieved when the contents are within the above ranges.

The first internal brazing material and the second internal brazing material may comprise 0.050 mass % or less of Ag, B, Be, Ca, Cd, Co, Ga, Ge, Hg, In, Li, Mo, Ni, P, Pb, Sn, V, and Y as unavoidable impurities.

The first cladding material and the second cladding material according to the aluminum alloy brazing sheet of the first embodiment of the present invention and the aluminum alloy brazing sheet of the second embodiment of the present invention are formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

The first cladding material and the second cladding material comprise Si. Si comprised in the first cladding material and the second cladding material contributes to brazing jointability by reducing decrease in the Si contents of the first cladding material and the second cladding material when the first cladding material and the second cladding material are fused with the first internal brazing material and the second internal brazing material, respectively, at the brazing temperature. The Si contents in the first cladding material and the second cladding material are 6.00 mass % to 13.00 mass %. The Si contents in the first cladding material and the second cladding material within the above range allow sufficient brazing jointability to be obtained. On the other hand, Si contents in the first cladding material and the second cladding material of less than the above range cause the Si contents in the first internal brazing material and the second internal brazing material to be lowered and thus brazeability to deteriorate. Si contents of more than the above range cause cracks to be easily generated during material production and thus production of the brazing sheet to be difficult.

The first cladding material and the second cladding material comprise Mg. Comprising Mg in the first cladding material and the second cladding material existing at the outermost layers allows a very small amount of Mg in the outermost surfaces of the first cladding material and the second cladding material to evaporate during brazing, the oxidation components in the atmosphere on the material surface to be decreased, and thus an atmosphere having very few oxidation components to be formed. This prevents re-oxidation of the material surface and improves brazeability. The Mg contents in the first cladding material and the second cladding material are more than 0.050 mass % and 0.50 mass % or less. The Mg contents in the cladding materials within the above range allow a trapping effect of oxidation components in the atmosphere due to evaporation of Mg on the outermost surfaces of the first cladding material and the second cladding material during brazing to be achieved and the re-oxidation to be prevented, resulting in improved brazeability. On the other hand, Mg contents in the first cladding material and the second cladding material of less than the above range cause the trap effect of the oxidation component of the atmosphere to be poor, whereas Mg contents of more than the above range cause Mg to be oxidized during brazing and to form MgO, resulting in poor brazeability.

The first cladding material and the second cladding material may comprise 1.00 mass % or less of Bi. The Bi contents in the cladding materials are preferably 0.050 mass % or less.

The first cladding material and the second cladding material may comprise any one or more of Na, Sr, and Sb. In the aluminum alloy forming the first cladding material and the second cladding material, Na, Sr, and Sb exhibit the effect of forming fine Si particles in the first cladding material and the second cladding material and improving the fluidity of the brazing substance. In the case where the first cladding material and the second cladding material comprise Na, the Na contents are 0.050 mass % or less and preferably 0.005 mass % to 0.040 mass %. In the case where the first cladding material and the second cladding material comprise Sr, the Sr contents are 0.050 mass % or less and preferably 0.005 mass % to 0.040 mass %. In the case where the first cladding material and the second cladding material comprise Sb, the Sb contents are 0.050 mass % or less and preferably 0.005 mass % to 0.040 mass %. The contents of Na, Sr, and Sb in the first cladding material and the second cladding material within the above ranges allow the effect of forming fine Si particles to be achieved. On the other hand, contents of Na, Sr, and Sb in the first cladding material and the second cladding material of more than the above ranges cause the effect to be saturated, which is not economical.

The first cladding material and the second cladding material may comprise any one or two of Zn and Cu. In the aluminum alloy forming the first cladding material and the second cladding material, Zn and Cu allow the melting points of the first cladding material and the second cladding material to be lowered and the first cladding material and the second cladding material to fuse with the first internal brazing material and the second internal brazing material, respectively, at a temperature of lower than 600° C., which is a common brazing temperature.

In the case where the first cladding material and the second cladding material comprise Zn, the Zn contents are preferably 6.00 mass % or less, particularly preferably 1.00 mass % to 5.50 mass %, and further preferably 3.00 mass % to 5.00 mass % from the viewpoint of easily achieving the effect of lowering the melting points of the first cladding material and the second cladding material. On the other hand, Zn contents in the first cladding material and the second cladding material of more than the above range cause cracks to be generated during material production and thus production of the brazing sheet to be difficult. In the case where the first cladding material and the second cladding material comprise Zn, the Zn contents in the first cladding material and the second cladding material are preferably 3.00 mass % or less from the viewpoint that the effect of preventing corrosion of the core material is easily achieved by setting the potential of the first cladding material and the second cladding material less-noble and preferentially corroding the cladding materials against the core material.

In the case where the first cladding material and the second cladding material comprise Cu, the Cu contents are 2.00 mass % or less, preferably 0.50 mass % to 2.00 mass %, and particularly preferably 1.00 mass % to 2.00 mass %. The Cu contents in the first cladding material and the second cladding material within the above range allow the effect of lowering the melting points of the first cladding material and the second cladding material to be improved. On the other hand, Cu contents in the first cladding material and the second cladding material of more than the above range cause cracks to be generated during material production and thus production of the brazing sheet to be difficult.

The first cladding material and the second cladding material may comprise Fe. In the aluminum alloy forming the first cladding material and the second cladding material, Fe precipitates relatively coarse Al—Fe-based compounds, is fused with the brazing material during brazing, and acts on forming fine grains of the remaining brazing material after brazing. In the case where the first cladding material and the second cladding material comprise Fe, the Fe contents in the first cladding material and the second cladding material are 1.00 mass % or less and preferably 0.10 mass % to 0.50 mass %. The Fe contents in the first cladding material and the second cladding material within the above range allow the effect of forming fine grains to be easily achieved. On the other hand, Fe contents in the first cladding material and the second cladding material of more than the above range cause giant intermetallic compounds to be easily formed during casting and thus plastic workability to deteriorate.

The first cladding material and the second cladding material may comprise any one or more of Mn, Cr, Ti, and Zr. In the aluminum alloy forming the first cladding material and the second cladding material, Mn, Cr, Ti, and Zr precipitate Al—Mn-based, Al—Cr-based, Al—Ti-based, and Al—Zr-based fine compounds, respectively, and act on coarsening grains of the remaining brazing material after brazing.

In the case where the first cladding material and the second cladding material comprise Mn, the Mn contents are 2.00 mass % or less and preferably 0.10 mass % to 0.60 mass %. The Mn contents in the first cladding material and the second cladding material within the above range allow the effect of coarsening grains to be easily achieved. On the other hand, Mn contents in the first cladding material and the second cladding material of more than the above range cause giant intermetallic compounds to be easily formed during casting and thus plastic workability to easily deteriorate.

In the case where the first cladding material and the second cladding material comprise Cr, the Cr contents in the first cladding material and the second cladding material are 0.30 mass % or less and preferably 0.10 mass % to 0.20 mass %. The Cr contents in the first cladding material and the second cladding material within the above range allow the effect of coarsening grains to be easily achieved. On the other hand, Cr contents in the first cladding material and the second cladding material of more than the above range cause giant intermetallic compounds to be easily formed during casting and thus plastic workability to deteriorate.

In the case where the first cladding material and the second cladding material comprise Ti, the Ti contents are 0.30 mass % or less and preferably 0.10 mass % to 0.20 mass %. The Ti contents in the first cladding material and the second cladding material within the above range allow the effect of coarsening grains to be easily achieved. On the other hand, Ti contents in the first cladding material and the second cladding material of more than the above range cause giant intermetallic compounds to be easily formed during casting and thus plastic workability to deteriorate.

In the case where the first cladding material and the second cladding material comprise Zr, the Zr contents are 0.30 mass % or less and preferably 0.10 mass % to 0.20 mass %. The Zr contents in the first cladding material and the second cladding material within the above range allow the effect of coarsening grains to be easily achieved. On the other hand, Zr contents in the first cladding material and the second cladding material of more than the above range cause giant intermetallic compounds to be easily formed during casting and thus plastic workability to deteriorate.

The grain size after brazing is adjusted by utilizing the above actions. The effects of the present invention can be sufficiently achieved when the contents are within the above ranges.

The first cladding material and the second cladding material may comprise 0.050 mass % or less of Ag, B, Be, Ca, Cd, Co, Ga, Ge, Hg, In, Li, Mo, Ni, P, Pb, Sn, V, and Y as unavoidable impurities.

In the aluminum alloy brazing sheet of the first embodiment of the present invention and the aluminum alloy brazing sheet of the second embodiment of the present invention, the first internal brazing material comprises more than 0.50 mass % and 4.50 mass % or less of Mg and 0.010 mass % to 0.50 mass % of Bi, and the first cladding material comprises more than 0.050 mass % and 0.50 mass % or less of Mg.

Mg added to the brazing material layer has smaller free energy of oxide generation than that of aluminum, and thus can reduce and break the surface oxide film in which aluminum is a main composition during brazing heating. However, in a two-layer aluminum alloy brazing sheet formed of the brazing material and the core material, the material in which Mg is added to the brazing material cannot be brazed because MgO is formed during a heat treatment process during material production, and thus this MgO is required to be removed by pretreatment or other treatment. In addition, even before brazing substance melting during brazing heating, Mg in the brazing material breaks the oxide film on the surface of the material that does not need to be broken yet, resulting in growing a thick and strong oxide film until the brazing substance melts. Furthermore, this oxide film comprises Mg, and thus reducing and breaking the oxide film by the same Mg are difficult to occur, resulting in not obtaining sufficient brazeability.

In addition, in a two-layer aluminum alloy brazing sheet formed of the brazing material and the core material, the material in which Mg is added to the core material is advantageous in that MgO formation can be prevented during material production and brazing temperature rise because Mg does not exist in the brazing material. However, there is a limitation to the amount of Mg that can be added to the core material due to formability and other restrictions, and thus brazing heating for a long period of time at high temperatures is required to diffuse Mg in the core material into the oxide film. In the case of practical brazing atmospheres, brazing at high temperatures for long periods of time accelerates oxidation of aluminum itself and thus the oxide film grows thicker, resulting in significant deterioration in brazeability.

Cladding an intermediate layer having a high Mg concentration between the brazing material and the core material allows Mg to be supplied from the intermediate layer without adding Mg to the brazing material and the oxide film to be efficiently broken to some extent. This material has high brazeability even in brazing heating for a relatively short period of time. In the case of practical brazing atmospheres, however, aluminum itself oxidizes to grow a thick and strong oxide film, and thus practical brazeability cannot be obtained unless the brazing conditions are suitable for the material.

In addition, breaking the oxide film caused by Mg relatively slowly proceeds under the influence of temperature and time. Therefore, in practical products comprising Mg, in the case where temperature differences are generated in the product during brazing, the breaking of the oxide film caused by Mg proceeds quickly in some areas and slowly in others, resulting in uneven fillet formation. Then, while a melted brazing substance flows into the joints where fillets have already formed by capillary force, the brazing substance flows out from the joints where fillets have not yet formed, and thus no fillets can be formed even when the oxide film is broken thereafter. Therefore, fatal unjointed parts are generated in practical products comprising numerous joint parts. Therefore, in order to obtain sufficient brazeability for the practical products comprising Mg, it is important to cause uniform and instant breaking of the oxide film caused by Mg to achieve brazing.

In order to break the oxide film uniformly and instantaneously, cladding the cladding material layer not comprising Mg onto the surface opposite to the core material of the brazing material layer after adding Mg to the brazing material layer may be exemplified. In other words, although the oxide film on the material surface remains thin because the cladding material layer placed on the outermost surface does not comprise Mg before melting the brazing substance during brazing heating, Mg comprised in the brazing material layer can reach the surface of the cladding material layer all at once when the brazing material layer melts, and thus the oxide film is broken. However, even in the material provided with the cladding material layer as described above, the Mg concentration in the brazing material layer is low in the order of a few percent, and thus the action of reducing and breaking the oxide film is slow and sufficient brazeability cannot be obtained in the practical products. On the other hand, addition of a large amount of Mg into the brazing material causes cracks to be easily generated during material production and thus production of the brazing sheet to be difficult.

Therefore, the inventors of the present invention have conducted intensive study and have found that a method of using Bi is an effective method for increasing the Mg concentration that acts on the material surface during brazing without increasing the Mg content added to the brazing material layer.

Bi bonds to Mg to form an intermetallic compound formed of $Mg_3Bi_2$, and the Mg concentration in the $Mg_3Bi_2$ compound is extremely high as 85 mass %. Therefore, action of $Mg_3Bi_2$ on the oxide film allows the breaking action of the oxide film to be sharply enhanced and the brazeability reaches a practical level.

Furthermore, in practical products, there are joint parts that are difficult to expose to the brazing atmosphere such as a large-area joint parts only having a clearance of 1 mm or less. The inventors of the present invention have found that when such joint parts are materials comprising Mg in the outermost surface, Mg evaporates slightly during the brazing heating to decrease the oxidation components in the atmosphere on the material surface and to form an atmosphere having very few oxidation components, whereby the re-oxidation of the material surface is prevented and brazeability is improved.

In other words, in the aluminum alloy brazing sheet of the first embodiment of the present invention and the aluminum alloy brazing sheet of the second embodiment of the present invention, the first internal brazing material comprises more than 0.50 mass % and 4.50 mass % or less of Mg and 0.010 mass % to 0.50 mass % of Bi, and the first cladding material comprises more than 0.050 mass % and 0.50 mass % or less of Mg to obtain desired brazeability.

In addition, when brazing heating is applied, the first internal brazing material layer and the first cladding material layer are melted and fused to decrease the Mg and Bi concentrations, resulting in decomposition of $Mg_3Bi_2$ in the melted brazing substance before $Mg_3Bi_2$ acts on the oxide film. Therefore, the inventors of the present invention have found that the brazeability is further improved by controlling not only the Mg concentration in the first internal brazing material layer but also the average values of the concentrations of Mg and Bi added to the brazing material 1 layer and the first cladding material layer in the thickness direction.

In addition, in the aluminum alloy brazing sheet of the first embodiment of the present invention and the aluminum alloy brazing sheet of the second embodiment of the present invention, the brazeability is further improved by setting the average Mg concentration in the thickness direction of the first internal brazing material and the first cladding material to a concentration of more than 0.50 mass %, and the average Bi concentration in a thickness direction of the first internal brazing material and the first cladding material to a concentration of more than 0.050 mass %.

The average Mg concentration in the thickness direction of the first internal brazing material and the first cladding material is preferably more than 0.50 mass %, more preferably 0.65 mass % or more, and further preferably 0.80 mass % or more. The average Mg concentration in the thickness direction of the first internal brazing material and the first cladding material within the above range allows the stability of $Mg_3Bi_2$ to be improved and an effect of delaying decomposition in the melted brazing substance to be sufficiently achieved. The average Mg concentration in the thickness direction of the first internal brazing material and the first cladding material is preferably higher concentrations from the viewpoint of brazeability, and thus the upper concentration limit may not be determined. This upper limit is determined by the upper limit of the Mg content of the first internal brazing material, which is described separately.

The average Bi concentration in the thickness direction of the first internal brazing material and the first cladding material is preferably more than 0.050 mass %, more preferably 0.065 mass % or more, and further preferably 0.080 mass % or more. The average Bi concentration in the thickness direction of the first internal brazing material and the first cladding material within the above range allows the stability of $Mg_3Bi_2$ to be improved and an effect of delaying decomposition in the melted brazing substance to be sufficiently achieved. The average Bi concentration in the thickness direction of the first internal brazing material and the first cladding material is preferably higher concentrations from the viewpoint of brazeability, and thus the upper concentration limit may not be determined. This upper limit is determined by the upper limit of the Bi content of the first internal brazing material, which is described separately.

$Mg_3Bi_2$ decomposes during brazing heating when the Mg and Bi concentrations are low, and thus the brazeability improvement effect described above is not sufficiently achieved. In addition, not only does the Mg concentration in the first internal brazing material layer decrease but the Mg and Bi concentrations decrease by melting and fusing the brazing material 1 layer and the first cladding material layer and thus $Mg_3Bi_2$ decomposes in the melted brazing substance before acting on the oxide film. Therefore, as a result of the intensive study on the Mg and Bi concentrations providing excellent brazeability, the inventors of the present invention have found that the brazeability can be improved by controlling the content of Mg added to the first internal brazing material layer and the first cladding material layer and the content of Bi added to the first internal brazing material layer to predetermined ranges.

Here, in the present invention, the average Mg concentration in the thickness direction of the first internal brazing material and the first cladding material and the average Bi concentration in the thickness direction of the first internal brazing material and the first cladding material are determined as follows, when the Mg content of the first internal brazing material is defined as $A_1$ mass %, the Bi content of the first internal brazing material as $B_1$ mass %, the Mg content of the first cladding material as $C_1$ mass %, the Bi content of the first cladding material as $D_1$ mass %, the thickness of the first internal brazing material as $T_1$(mm), and the thickness of the first cladding material as $t_1$(mm).

Average Mg concentration (%) in thickness direction of first internal brazing material and first cladding material $= (A_1 \times T_1 + C_1 \times t_1)/(T_1 + t_1)$ Average Bi concentration (%) in thickness direction of first internal brazing material and first cladding material $= (B_1 \times T_1 + D_1 \times t_1)/(T_1 + t_1)$ The thickness of the first internal brazing material is preferably 15.0 μm or more. As the brazing material becomes thicker, the absolute amount of the $Mg_3Bi_2$ compound becomes larger, resulting in promoting the breaking of the oxide film. A thickness of the first internal brazing material of 15.0 μm or more allows the average Mg concentration in the thickness direction of the first internal brazing material and the first cladding material and the average Bi concentration in the thickness direction of the first internal brazing material and the first cladding material to be easily adjusted to a predetermined concentration. The upper limit of the thickness of the first internal brazing material may be defined, and the range of the thickness of the first internal brazing material required for the practical products is about 15.0 μm to about 400 μm.

The thickness of the first cladding material is preferably 5.0 μm or more. As the first cladding material becomes thicker, the brazeability is more improved because Mg in the first internal brazing material is difficult to diffuse to the surface of the first cladding material. A thickness of the first cladding material of 5.0 μm or more allows oxidation prevention action of Mg to be easily achieved due to difficultly in diffusion of high-concentration Mg in the first internal brazing material to the surface of the first cladding material. The upper limit of the thickness of the first cladding material may not be defined, and the thickness of the first cladding material is preferably 120 μm or less from the viewpoint that the average Mg concentration in the thickness direction of the first internal brazing material and the first cladding material and the average Bi concentration in the thickness direction of the first internal brazing material and the first cladding material are easily adjusted. Therefore, a practical range of the thickness of the first cladding material is about 5.0 μm to about 120 μm.

In the aluminum alloy brazing sheet of the first embodiment of the present invention and the aluminum alloy brazing sheet of the second embodiment of the present invention, the average Mg concentration in the thickness direction of the second internal brazing material and the second cladding material is preferably determined to be a concentration of more than 0.50 mass % and the average Bi concentration in the thickness direction of the second internal brazing material and the second cladding material is preferably determined to be a concentration of more than 0.050 mass %. This further improves brazeability.

The first sacrificial anode material according to the aluminum alloy brazing sheet of the first embodiment of the present invention, the second sacrificial anode material according to the aluminum alloy brazing sheet of the second embodiment of the present invention, and the third sacrificial anode material according to the aluminum alloy brazing sheet of the second embodiment of the present invention are formed of an aluminum alloy comprising any one or more of 5.00 mass % or less of Si, 1.50 mass % or less of Fe, 2.00 mass % or less of Cu, 2.00 mass % or less of Mn, 3.00 mass % or less of Mg, 6.00 mass % or less of Zn, 0.30 mass % or less of Cr, 0.30 mass % or less of Ti, and 0.30 mass % or less of Zr, and formed with the balance being Al and inevitable impurities. The first sacrificial anode material, the second sacrificial anode material, and the third sacrificial anode material are hereinafter collectively referred to as simply the "sacrificial anode material".

In the sacrificial anode material formed of the aluminum alloy, Si contributes to strength enhancement. In the case where the sacrificial anode material comprises Si, the Si content in the sacrificial anode material is 5.00 mass % or less, preferably 0.10 mass % to 1.50 mass %, and particularly preferably 0.10 mass % to 1.00 mass %. The Si content in the sacrificial anode material in the above range allows the strength of the sacrificial anode material to be improved. The Si content in the sacrificial anode material is 1.50 mass % to 5.00 mass % and particularly preferably 2.50 mass % to 4.50 mass %. In the range of the content of 1.50 mass % to 5.00 mass %, the material is in a semi-melted state during brazing heating and thus brazeability is improved in the case where the sacrificial anode material surface acts as a brazed surface by supplying a small amount of liquid phase brazing substance. On the other hand, a Si content in the sacrificial anode material of more than the above range causes the melting point to be excessively low, local melting to occur during brazing, and deformation of the sacrificial anode material to occur.

Fe contributes to strength enhancement. In the case where the sacrificial anode material comprises Fe, the Fe content in the sacrificial anode material is 1.50 mass % or less and preferably 0.10 mass % to 0.70 mass %. The Fe content in the sacrificial anode material within the above range allows the strength of the sacrificial anode material to be improved. On the other hand, a Fe content in the sacrificial anode material of more than the range causes corrosion resistance to deteriorate and giant compounds to be easily generated.

Cu contributes to strength enhancement and potential adjustment. In the case where the sacrificial anode material comprises Cu, the Cu content in the sacrificial anode material is 2.00 mass % or less and preferably 0.10 mass % to 1.00 mass %. The Cu content in the sacrificial anode material within the above range allows the strength of the sacrificial anode material to be improved. On the other hand, a Cu content in the sacrificial anode material of more than the above range causes intergranular corrosion to easily occur and the melting point to be excessively low.

Mn contributes to strength enhancement and potential adjustment. In the case where the sacrificial anode material comprises Mn, the Mn content in the sacrificial anode material is 2.00 mass % or less and preferably 0.30 mass % to 1.80 mass %. The Mn content in the sacrificial anode material within the above range allows the strength of the sacrificial anode material to be improved and the effect of adjusting the potential to be achieved. On the other hand, a Mn content in the sacrificial anode material of more than the above range causes cracks to be easily generated during material rolling.

Mg contributes to strength enhancement. In the case where the sacrificial anode material comprises Mg, the Mg content in the sacrificial anode material is 3.00 mass % or less and preferably 0.30 mass % to 1.80 mass %. The Mg content in the sacrificial anode material within the above range allows the effect of the strength enhancement to be easily achieved. On the other hand, a Mg content in the sacrificial anode material of more than the above range causes cracks to be easily generated during material rolling.

Zn contributes to potential adjustment. In the case where the sacrificial anode material comprises Zn, the Zn content in the sacrificial anode material is 6.00 mass % or less and preferably 3.00 mass % or less. The Zn content in the sacrificial anode material within the above range allows the sacrificial protection effect to be improved. On the other hand, a Zn content in the sacrificial anode material of more than the above range causes the potential of the sacrificial anode material to be excessively lowered and thus corrosion may rapidly progress.

Cr improves strength by solid solution strengthening, also precipitates fine Al—Cr-based compounds, and acts on coarsening grains after brazing. The Cr content in the sacrificial anode material is 0.30 mass % or less and preferably 0.10 mass % to 0.20 mass %. The Cr content in the sacrificial anode material in the above range allows the strength of the sacrificial anode material to be improved. On the other hand, a Cr content in the sacrificial anode material of more than the above range causes giant intermetallic compounds to be easily formed during casting and thus plastic workability to deteriorate.

Ti improves strength by solid solution strengthening, and is distributed in layers to form high and low potential layers in the sacrificial anode material, whereby the corrosion form changes from pitting corrosion to layer corrosion to exhibit the effect of improving corrosion resistance. The Ti content in the sacrificial anode material is 0.30 mass % or less and preferably 0.10 mass % to 0.20 mass %. The Ti content in the sacrificial anode material within the above range allows the strength of the sacrificial anode material to be improved and corrosion resistance to be improved. On the other hand, a Ti content in the sacrificial anode material of more than the above range causes giant intermetallic compounds to be easily formed during casting and thus plastic workability to deteriorate.

Zr improves strength by solid solution strengthening, also precipitates Al—Zr-based fine compounds, and acts on coarsening grains after brazing. The Zr content in the sacrificial anode material is 0.30 mass % or less and preferably 0.10 mass % to 0.20 mass %. The Zr content in the sacrificial anode material within the above range allows the strength of the sacrificial anode material to be improved and the effect of coarsening grains after brazing to be achieved. On the other hand, a Zr content in the sacrificial anode material of more than the above range causes giant intermetallic compounds to be easily formed during casting and thus plastic workability to deteriorate.

The sacrificial anode material may comprise 0.050 mass % or less of Ag, B, Be, Bi, Ca, Cd, Co, Ga, Ge, Hg, In, Li, Mo, Na, Ni, P, Pb, Sb, Sn, Sr, V, and Y as unavoidable impurities.

The outer surface brazing material according to the aluminum alloy brazing sheet of the first embodiment of the present invention and the outer surface brazing material according to the aluminum alloy brazing sheet of the second embodiment of the present invention are formed of an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

The outer surface brazing material comprises Si. In the outer surface brazing material formed of the aluminum alloy, Si contributes to brazing jointability. The Si content in the outer surface brazing material is 6.00 mass % to 13.00 mass %. The Si content in the outer surface brazing material within the above range allows sufficient brazing jointability to be obtained. A Si content in the outer surface brazing material of less than the above range causes jointability to be inferior, whereas a Si content of more than the above range causes cracks to be easily generated during material production and thus the production of the brazing sheet to be difficult.

In the case where the outer surface brazing material comprises Fe, the Fe content in the outer surface brazing material is 1.00 mass % or less and preferably 0.10 mass % to 0.50 mass %. The Fe content in the outer surface brazing material within the above range allows the effect of forming fine grains to be easily achieved. On the other hand, a Fe contents in the outer surface brazing material of more than the above range causes giant intermetallic compounds to be easily formed during casting and thus plastic workability to deteriorate.

In the case where the outer surface brazing material comprises Cu, the Cu content in the outer surface brazing material is 2.00 mass % or less and 0.50 mass % to 2.00 mass %. The Cu content in the outer surface brazing material within the above range allows the effect of lowering the melting point of the brazing material to be improved. On the other hand, a Cu content in the outer surface brazing material of more than the above range causes cracks to be generated during material production and thus production of the brazing sheet to be difficult.

In the case where the outer surface brazing material comprises Mn, the Mn content in the outer surface brazing material is 2.00 mass % or less and preferably 0.10 mass % to 0.60 mass %. The Mn content in the outer surface brazing material within the above range allows the effect of coarsening grains to be easily achieved. On the other hand, a Mn contents in the outer surface brazing material of more than the above range causes giant intermetallic compounds to be easily formed during casting and thus plastic workability to be easily decreased.

In the case where the outer surface brazing material comprises Mg, the Mg content in the outer surface brazing material is 4.50 mass % or less and preferably 0.60 mass % to 4.00 mass %. The Mg content in the outer surface brazing material within the above range allows sufficient brazing jointability to be obtained. A Mg content in the outer surface brazing material of equal to or less than the above range causes the effect of breaking the oxide film to be insufficient, whereas a Mg content of more than the above range causes cracks to be easily generated during material production and thus production of the brazing sheet to be difficult.

In the case where the outer surface brazing material comprises Zn, the Zn content in the outer surface brazing material is preferably 6.00 mass % or less from the viewpoint of easily achieving the effect of lowering the melting point of the brazing material. On the other hand, a Zn content in the outer surface brazing material of more than 6.00 mass % causes cracks to be generated during material production and thus production of the brazing sheet to be difficult. In addition, in the case where the outer surface brazing material comprises Zn, the Zn content in the outer surface brazing material is 3.00 mass % or less from the viewpoint that the effect of preventing corrosion of the core material is easily achieved by setting the potential of the brazing material less-noble and preferentially corroding the outer surface brazing material against the core material.

In the case where the outer surface brazing material comprises Bi, the Bi content in the outer surface brazing material is 0.50 mass % or less. The Bi content in the outer surface brazing material within the above range allows the sufficient brazing jointability to be obtained. A Bi content in the outer surface brazing material of less than the above range causes the action of promoting the breaking effect of the oxide film caused by Mg to be insufficient, whereas a Bi content of more than the above range causes cracks to be easily generated during material production and thus the production of the brazing sheet to be difficult.

In the case where the outer surface brazing material comprises Cr, the Cr content in the outer surface brazing material is 0.30 mass % or less and preferably 0.10 mass % to 0.20 mass %. The Cr content in the outer surface brazing material within the above range allows the effect of coarsening grains to be easily achieved. On the other hand, a Cr content in the outer surface brazing material of more than the above range causes giant intermetallic compounds to be easily formed during casting, and plastic workability to deteriorate.

In the case where the outer surface brazing material comprises Ti, The Ti content in the outer surface brazing material is 0.30 mass % or less and preferably 0.10 mass % to 0.20 mass %. The Ti content in the outer surface brazing material within the above range allows the effect of coarsening grains to be easily achieved. On the other hand, a Ti content in the outer surface brazing material of more than the above range causes giant intermetallic compounds to be easily formed during casting and thus plastic workability to deteriorate.

In the case where the outer surface brazing material comprises Zr, the Zr content in the outer surface brazing material is 0.30 mass % or less and preferably 0.10 mass % to 0.20 mass %. The Zr content in the outer surface brazing material within the above range allows the effect of coarsening grains to be easily achieved. On the other hand, a Zr content in the outer surface brazing material of more than the above range causes giant intermetallic compounds to be easily formed during casting and thus plastic workability to deteriorate.

The grain size after brazing is adjusted by utilizing the above actions. The effects of the present invention can be sufficiently achieved when the contents are within the above ranges.

The outer surface brazing material may comprise any one or more of Na, Sr, and Sb. In the aluminum alloy forming the outer surface brazing material, Na, Sr, and Sb exhibit the effect of forming fine Si particles in the brazing material and improving the flowability of the brazing substance. In the case where the outer surface brazing material comprises Na, the Na content in the outer surface brazing material is 0.050 mass % or less and preferably 0.005 mass % to 0.040 mass %. In the case where the outer surface brazing material comprises Sr, the Sr content in the outer surface brazing material is 0.050 mass % or less and preferably 0.005 mass % to 0.040 mass %. In the case where the outer surface brazing material comprises Sb, the Sb content in the outer surface brazing material is 0.050 mass % or less and preferably 0.005 mass % to 0.040 mass %. The Na, Sr, and Sb contents in the outer surface brazing material within the above ranges allow the effect of forming fine Si particles to be achieved. On the other hand, contents of Na, Sr, and Sb in the outer surface brazing material of more than the above ranges cause the effect to be saturated, which is not economical.

The outer surface brazing material may comprise 0.050 mass % or less of Ag, B, Be, Ca, Cd, Co, Ga, Ge, Hg, In, Li, Mo, Ni, P, Pb, Sn, V, and Y as unavoidable impurities.

As a method for producing the aluminum alloy brazing sheet of the first embodiment of the present invention and the aluminum alloy brazing sheet of the second embodiment of the present invention, the following production method can be exemplified. First, aluminum alloy ingots having the compositions of the core material according to the aluminum alloy brazing sheet of first embodiment of the present invention and the aluminum alloy brazing sheet of the second embodiment of the present invention are prepared, and the aluminum alloy ingots for the core material are set to a predetermined thickness. In addition, aluminum alloy ingots having the compositions of aluminum alloy ingots for the clad (first cladding material, second cladding material, first internal brazing material, second internal brazing material, first sacrificial anode material, second sacrificial anode material, third sacrificial anode material, and outer surface brazing material) according to the aluminum alloy brazing sheet of first embodiment of the present invention and the aluminum alloy brazing sheet of second embodiment of the present invention are prepared and these aluminum alloy ingots are processed into predetermined thicknesses by hot rolling or other methods. Subsequently, the aluminum alloy ingot for the core material is subjected to homogenization treatment at 450° C. to 630° C. for 1 hour to 100 hours, if necessary. Subsequently, the aluminum alloy ingot for the core material and the predetermined aluminum alloy ingots for the clad are stacked in a predetermined stacking order and the stacked ingots are subjected to hot rolling at 400° C. to 550° C. Subsequently, the hot-rolled product is subjected to one or more passes of cold rolling and, if necessary, intermediate annealing and/or final annealing at 250° C. to 450° C. for 1 hour to 24 hours to a predetermined thickness to give the aluminum alloy brazing sheet of the first embodiment of the present invention or the aluminum alloy brazing sheet of the second embodiment of the present invention.

The aluminum alloy brazing sheet of the first embodiment of the present invention and the aluminum alloy brazing sheet of the second embodiment of the present invention are processed into predetermined shapes of heat exchanger components. The processed products are combined together with other heat exchanger components as part of the heat exchanger and subsequently the combined product is subjected to brazing heating in an inert gas atmosphere at the maximum temperature of 580° C. to 630° C. for 1 minute to 10 minutes without using a flux to perform brazing, resulting in completing the heat exchanger.

The aluminum alloy brazing sheet of the first embodiment of the present invention and the aluminum alloy brazing sheet of the second embodiment of the present invention have excellent brazeability in brazing in the inert gas atmosphere. The brazeability of clad sheet materials is generally evaluated by a clearance filling test (LWST 8801). This clearance filling test, however, is insufficient to evaluate the practical brazeability so that the brazing substance is flowed in and flowed out among a plurality of joint parts, because the fillet is formed from one point and grows. In order to solve this problem, therefore, the inventors of the present invention have developed an "overlapped opening-mouth test" and have evaluated the brazeability of each test material. As illustrated in FIG. 1, the overlapped opening-mouth test described below is a test in which a test material cut into a predetermined size of, for example, 15 mm in width and 25 mm in length and a bare material of A3003-O having a thickness of 1.0 mm cut into a predetermined size of, for example, 15 mm in width and 25 mm in length are overlapped so that the surface of the side where the first cladding material and the first internal brazing material are cladded is arranged inside, a spacer having a diameter of 1.6 mm is inserted into the bare material by lifting one side of the bare material, and the test material and the bare material on the opposite side to the spacer are brought into linearly contact, whereby a test body provided with a very small clearance between the test material and the bare material is prepared and the test body is brazed in a state where the linear contact part of the test material and the bare material is in parallel with gravity. In the brazing heating in the overlapped opening-mouth test, the test material is assembled to the overlapped opening-mouth test body and thereafter is subjected to brazing heating in a furnace in a nitrogen gas atmosphere without using a flux. In the brazing heating conditions, an oxygen concentration in the furnace is controlled at 50 ppm or less and a dew point of −45° C. or less when the temperature of the test body during the temperature rise is 400° C. or more, and the oxygen concentration is controlled at 10 ppm or less and the dew point of −60° C. or less when the temperature of the test body is 570° C. or more. The maximum temperature of the test body is determined to be 600° C. In this overlapped opening-mouth test, for example, in the case where the oxide film breaking is delayed on the upper side compared to the lower side in the gravity direction, the fillet is formed first on the lower side, and thus the brazing material that is expected to form the fillet on the upper side may flow out to the lower side where the fillet is formed. This test is an extremely excellent evaluation method that can easily evaluate the inflow and outflow of the brazing substance in practical products. Therefore, according to the overlapped opening-mouth test, the practical brazeability in which inflow and outflow of the brazing substance between the joint parts occur can be adequately evaluated.

Hereinafter, the present invention will be specifically described with reference to Examples. The present invention, however, is not limited to Examples described below.

EXAMPLES

Examples and Comparative Examples

Each of an ingot for a core material, an ingot for an internal brazing material, and an ingot for a cladding material having compositions listed in Table 1 was formed by continuous casting. With respect to the ingot for the core material, the obtained ingot was machined to a size of 163 mm in length, 163 mm in width, and 27 mm in thickness. With respect to the ingot for the cladding material and the ingot for the brazing material, the obtained ingots were hot rolled at 500° C. to a thickness of 3 mm, cold rolled to a predetermined thickness, and cut into a dimension of 163 mm in length and 163 mm in width.

TABLE 1

| Alloy No. | Si | Fe | Cu | Mn | Mg | Zn | Ti | Bi |
|---|---|---|---|---|---|---|---|---|
| A3003 | 0.28 | 0.61 | 0.16 | 1.19 | 0.01 | 0.02 | 0.01 | <0.01 |
| R01 | 7.32 | 0.19 | <0.01 | <0.01 | <0.01 | <0.01 | <0.01 | <0.01 |
| R03 | 7.36 | 0.19 | <0.01 | <0.01 | 0.31 | <0.01 | <0.01 | <0.01 |
| R04 | 7.48 | 0.19 | <0.01 | <0.01 | 0.33 | <0.01 | <0.01 | 0.15 |
| R06 | 7.65 | 0.20 | <0.01 | <0.01 | 1.01 | <0.01 | <0.01 | <0.01 |
| R08 | 7.49 | 0.19 | <0.01 | <0.01 | 1.05 | <0.01 | <0.01 | 0.31 |
| R11 | 7.75 | 0.19 | <0.01 | <0.01 | 1.81 | <0.01 | <0.01 | 0.23 |
| R12 | 7.65 | 0.20 | <0.01 | <0.01 | 1.97 | <0.01 | <0.01 | 0.13 |
| R13 | 7.90 | 0.20 | <0.01 | <0.01 | 2.41 | <0.01 | <0.01 | <0.01 |
| R15 | 7.53 | 0.19 | <0.01 | <0.01 | 2.49 | <0.01 | <0.01 | 0.25 |
| R17 | 7.96 | 0.19 | <0.01 | <0.01 | 4.21 | <0.01 | <0.01 | 0.08 |
| R26 | 7.69 | 0.19 | <0.01 | <0.01 | 0.10 | <0.01 | 0.01 | <0.01 |
| R27 | 7.79 | 0.19 | <0.01 | <0.01 | 0.59 | <0.01 | 0.01 | <0.01 |

The prepared ingot for the core material, ingot for the internal brazing material, and ingot for the cladding material were hot rolled and cold rolled in the combinations listed in Table 2 to set the thickness to 0.6 mm. Thereafter, final annealing was performed at 360° C. using a common method to give an annealed clad sheet material stacked in order of first cladding material/first internal brazing material/core material (in Comparative Example 1, in order of first internal brazing material/core material). The obtained clad sheet material was used as the test material.

TABLE 2

| | Alloy No. | | | Clad ratio (%) | | Average concentration of internal brazing material and cladding material | |
|---|---|---|---|---|---|---|---|
| | Cladding material | Internal brazing material | Core material | Cladding material | Internal brazing material | Average Mg concentration (%) | Average Bi concentration (%) |
| Example 1 | R03 | R11 | A3003 | 5.0 | 5.0 | 1.05 | 0.15 |
| Example 2 | R26 | R15 | A3003 | 2.5 | 7.5 | 1.90 | 0.23 |
| Example 3 | R03 | R15 | A3003 | 2.5 | 7.5 | 1.95 | 0.23 |
| Comparative Example 1 | — | R08 | A3003 | — | 10.0 | 1.00 | 0.30 |
| Comparative Example 2 | R01 | R04 | A3003 | 2.5 | 7.5 | 0.23 | 0.11 |
| Comparative Example 3 | R06 | R11 | A3003 | 5.0 | 5.0 | 1.40 | 0.15 |
| Comparative | R08 | R15 | A3003 | 5.0 | 5.0 | 1.75 | 0.30 |

TABLE 2-continued

| | Alloy No. | | | Clad ratio (%) | | Average concentration of internal brazing material and cladding material | |
| | Cladding material | Internal brazing material | Core material | Cladding material | Internal brazing material | Average Mg concentration (%) | Average Bi concentration (%) |
|---|---|---|---|---|---|---|---|
| Example 4 | | | | | | | |
| Comparative Example 5 | R01 | R12 | A3003 | 5.0 | 5.0 | 1.00 | 0.08 |
| Comparative Example 6 | R01 | R17 | A3003 | 5.0 | 5.0 | 2.00 | 0.08 |
| Comparative Example 7 | R01 | R15 | A3003 | 1.3 | 8.8 | 2.19 | 0.26 |
| Comparative Example 8 | R27 | R15 | A3003 | 2.5 | 7.5 | 2.03 | 0.23 |
| Comparative Example 9 | R01 | R13 | A3003 | 1.3 | 8.8 | 2.19 | 0.00 |

Subsequently, the obtained clad sheet materials were subjected to an overlapped opening-mouth test described below. The results are listed in Table 3.

<Overlapped Opening-Mouth Test>

As illustrated in FIG. 1, a test material cut into 15 mm in width and 25 mm in length and a bare material of A3003-O having a thickness of 1.0 mm cut into 15 mm in width and 25 mm in length were overlapped so that the surface of the side where the first cladding material and the first internal brazing material were cladded was arranged inside, a spacer having a diameter of 1.6 mm was inserted into the bare material by lifting one side of the bare material, and the test material and the bare material on the opposite side to the spacer was brought into linearly contact, whereby a test body provided with a very small clearance between the test material and the bare material was prepared.

Subsequently, the test material was assembled into the overlapped opening-mouth test body, the test body was subjected to brazing heating in a furnace in a nitrogen atmosphere without using a flux, in a state where the linear contact part of the test material and the bare material was in parallel with gravity. In the brazing heating conditions, an oxygen concentration in the furnace was controlled at 50 ppm or less and a dew point of −45° C. or less when the temperature of the test body was 400° C. or more during the temperature rise, and the oxygen concentration was controlled at 10 ppm or less and the dew point of −60° C. or less when the temperature of the test body was 570° C. or more. The maximum temperature of the test body was determined to be 600° C.

Figure 2:
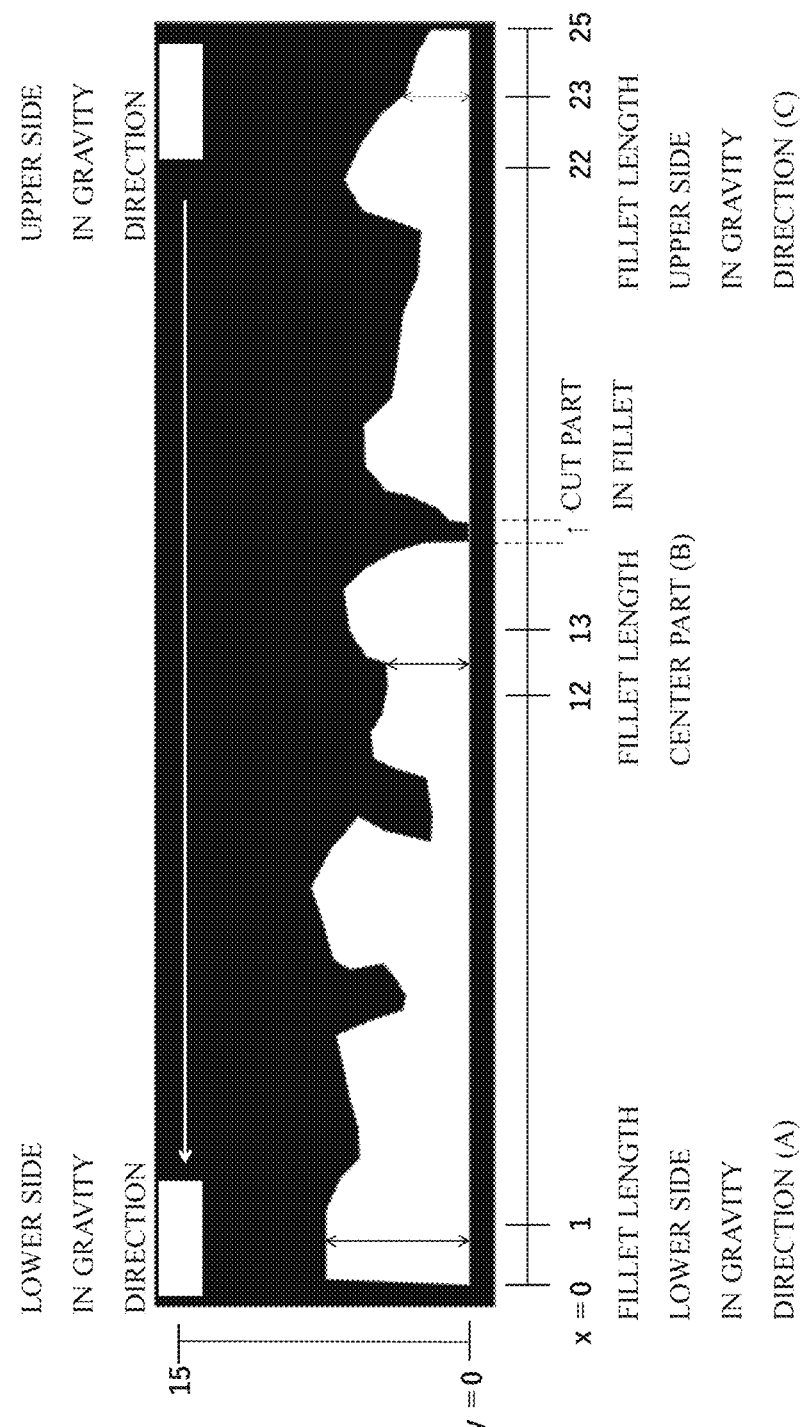
FIG. 2 is a schematic view of an X-ray CT image obtained by X-ray CT of a fillet shape.

After the brazing heating, a fillet shape formed in the very small clearance of the overlapped opening-mouth test body was photographed by X-ray CT. The photographing conditions were set to a tube voltage of 160 kV and a tube current of 100 μA, and the entire test body was photographed. FIG. 2 illustrates a schematic view of the acquired X-ray CT image. The fillet is illustrated in white. The left side of FIG. 2 is the lower side of the gravity and the right side is the upper side of the gravity. The obtained X-ray CT image was analyzed by ImageJ. The X-ray CT image was binarized in black and white. The direction of gravity was determined to be the x-axis and the fillet length perpendicular to the x-axis was quantified. From the results of the analysis, circle and cross determination was performed for each of the following three indicators.

(Indicator 1) In a range where both edges in which no fillets existed were eliminated, the case where the fillet length equaled to zero, that is, no fillets existed was determined to be "cut part existing in the fillet" (x), whereas the case where the fillet length did not equal to zero was determined to be "no cut part existing in the fillet" (○).

(Indicator 2) When the lower edge part of the fillet in the gravity direction was determent to be x=0, the minimum fillet length of x=12 mm to 13 mm was determine to be a center part (B), the minimum fillet length of x=22 mm to 23 mm was determined to be an upper side in the gravity direction (C), and the maximum fillet length of x=0 mm to 1 mm was determined to be a lower side in the gravity direction (A), "((B+C)/2)/A" was determined to be a gravity effected coefficient of the fillet length. A larger coefficient means that more uniform fillet was formed by defying gravity. The case where the coefficient was 0.35 or more was determined to be (○), whereas the case where the coefficient was less than 0.34 was determined to be (x).

(Indicator 3) The standard deviation of the fillet length was calculated in the range of x=0 to 25 mm. A smaller value means that more uniform fillet was formed. The case where the value was 0.6 mm or less was determined to be (○), whereas the case where the value was more than 0.6 mm was determined to be (x)

The evaluation results are listed in Table 3. In Examples, all of the indicators were determined to be ○. In Comparative Examples, some of the indicators were determined to be x.

TABLE 3

| | Indicator 1 | | Indicator 2 | | Indicator 3 | |
|---|---|---|---|---|---|---|
| Example 1 | ○ | | 0.40 | ○ | 0.59 | ○ |
| Example 2 | ○ | | 0.38 | ○ | 0.52 | ○ |
| Example 3 | ○ | | 0.41 | ○ | 0.57 | ○ |
| Comparative Example 1 | ○ | | 0.25 | x | 0.66 | x |
| Comparative Example 2 | x | | 0.56 | ○ | 0.93 | x |
| Comparative Example 3 | x | | 0.45 | ○ | 0.91 | x |
| Comparative Example 4 | x | | 0.48 | ○ | 0.82 | x |
| Comparative Example 5 | x | | 0.46 | ○ | 0.64 | x |
| Comparative Example 6 | ○ | | 0.37 | ○ | 0.63 | x |
| Comparative Example 7 | ○ | | 0.48 | ○ | 0.76 | x |
| Comparative Example 8 | ○ | | 0.55 | ○ | 0.88 | x |
| Comparative Example 9 | x | | 0.33 | x | 0.74 | x |

From the above results, it is found that the aluminum alloy brazing sheet of the first embodiment of the present invention comprises the first internal brazing material and the first cladding material in which the chemical compositions are within the defined ranges of the present invention, whereby has excellent brazeability in brazing in an inert gas atmosphere without using a flux.

In addition, from the above results, it is found that the aluminum alloy brazing sheet comprises the first cladding material serving as the outermost layer in which the chemical compositions are within the defined ranges of the present invention and the internal brazing material in which the chemical compositions are within the defined ranges of the present invention placed just under the first cladding material, whereby has excellent brazeability in brazing in an inert gas atmosphere without using a flux. Therefore, it is similarly assumed that the aluminum alloy brazing sheet of the second embodiment of the present invention comprising the first cladding material serving as the outermost layer in which the chemical compositions are within the defined ranges of the present invention and the internal brazing material in which the chemical compositions are within the defined ranges of the present invention placed just under the first cladding material, whereby also has excellent brazeability in brazing in an inert gas atmosphere without using a flux.

In addition, from the above results, it is found that in the case where the aluminum alloy brazing sheet of the first embodiment of the present invention or the aluminum alloy brazing sheet of the second embodiment of the present invention comprises the second internal brazing material and the second cladding material in which the chemical compositions are within the defined ranges of the present invention and that are placed on opposite sides of the first internal brazing material and the first cladding material to the core material, the aluminum alloy brazing sheet also has excellent brazeability in brazing in an inert gas atmosphere without using a flux.

The invention claimed is:

1. An aluminum alloy brazing sheet comprising:
a core material formed of pure aluminum or an aluminum alloy; and
a first internal brazing material and a first cladding material cladded on at least one side surface of the core material in order of first cladding material/first internal brazing material/core material,
the aluminum alloy brazing sheet being used for brazing in an inert gas atmosphere without using a flux, wherein
the first internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and
the first cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

2. The aluminum alloy brazing sheet according to claim 1, further comprising
a first sacrificial anode material cladded on another side surface of the core material in order of first cladding material/first internal brazing material/core material/first sacrificial anode material, wherein
the first sacrificial anode material A is formed of an aluminum alloy comprising any one or more of 5.00 mass % or less of Si, 1.50 mass % or less of Fe, 2.00 mass % or less of Cu, 2.00 mass % or less of Mn, 3.00 mass % or less of Mg, 6.00 mass % or less of Zn, 0.30 mass % or less of Cr, 0.30 mass % or less of Ti, and 0.30 mass % or less of Zr, and formed with the balance being Al and inevitable impurities.

3. The aluminum alloy brazing sheet according to claim 1, further comprising
an outer surface brazing material cladded on another side surface of the core material in order of first cladding material/first internal brazing material/core material/outer surface brazing material, wherein
the outer surface brazing material is formed of an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

4. The aluminum alloy brazing sheet according to claim 2, further comprising
an outer surface brazing material cladded on a surface of the first sacrificial anode material on an opposite side to the core material in order of first cladding material/first internal brazing material/core material/first sacrificial anode material/outer surface brazing material, wherein
the outer surface brazing material is formed of an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

5. The aluminum alloy brazing sheet according to claim 2, further comprising
a second internal brazing material and a second cladding material cladded on a surface of the first sacrificial anode material on an opposite side to the core material in order of first cladding material/first internal brazing material/core material/first sacrificial anode material/second internal brazing material/second cladding material, wherein
the second internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and
the second cladding material 2 is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

6. The aluminum alloy brazing sheet according to claim 1, further comprising
a second internal brazing material and a second cladding material cladded on another side surface of the core material in order of first cladding material/first internal brazing material/core material/second internal brazing material/second cladding material, wherein
the second internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and
the second cladding material 2 is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

7. An aluminum alloy brazing sheet comprising:

a core material formed of pure aluminum or an aluminum alloy; and a second sacrificial anode material, a first internal brazing material, and a first cladding material cladded on at least one side surface of the core material in order of first cladding material/first internal brazing material/second sacrificial anode material/core material, the aluminum alloy brazing sheet being used for brazing in an inert gas atmosphere without using a flux, wherein the first internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, the first cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities, and the second sacrificial anode material comprises any one or more of 5.00 mass % or less of Si, 1.50 mass % or less of Fe, 2.00 mass % or less of Cu, 2.00 mass % or less of Mn, 3.00 mass % or less of Mg, 6.00 mass % or less of Zn, 0.30 mass % or less of Cr, 0.30 mass % or less of Ti, and 0.30 mass % or less of Zr, and is formed with the balance being Al and inevitable impurities.

8. The aluminum alloy brazing sheet according to claim 7, further comprising a third sacrificial anode material cladded on another side surface of the core material in order of first cladding material/first internal brazing material/second sacrificial anode material/core material/third sacrificial anode material, wherein the third sacrificial anode material is an aluminum alloy comprising any one or more of 5.00 mass % or less of Si, 1.50 mass % or less of Fe, 2.00 mass % or less of Cu, 2.00 mass % or less of Mn, 3.00 mass % or less of Mg, 6.00 mass % or less of Zn, 0.30 mass % or less of Cr, 0.30 mass % or less of Ti, and 0.30 mass % or less of Zr, and formed with the balance being Al and inevitable impurities.

9. The aluminum alloy brazing sheet according to claim 7, further comprising an outer surface brazing material cladded on another side surface of the core material in order of first cladding material/first internal brazing material/second sacrificial anode material/core material/outer surface brazing material, wherein the outer surface brazing material is an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

10. The aluminum alloy brazing sheet according to claim 8, further comprising an outer surface brazing material cladded on a surface of the third sacrificial anode material on an opposite side to the core material in order of first cladding material/first internal brazing material/second sacrificial anode material/core material/third sacrificial anode material/outer surface brazing material, wherein the outer surface brazing material is an aluminum alloy comprising 6.00 mass % to 13.00 mass % of Si, further comprising any one or more of 1.00 mass % or less of Fe, 2.00 mass % or less of Cu, 2.00 mass % or less of Mn, 4.50 mass % or less of Mg, 6.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

11. The aluminum alloy brazing sheet according to claim 8, further comprising a second internal brazing material and a second cladding material cladded on a surface of the third sacrificial anode material on an opposite side to the core material in order of first cladding material/first internal brazing material/second sacrificial anode material/core material/third sacrificial anode material/second internal brazing material/second cladding material, wherein the second internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and the second cladding material is formed of an aluminum alloy comprising 6.00 mass % to 13.00 mass % of Si, more than 0.050 mass % and 0.50 mass % or less of Mg, having a Bi content of 1.00 mass % or less, and formed with the balance being Al and inevitable impurities.

12. The aluminum alloy brazing sheet according to claim 7, further comprising a second internal brazing material and a second cladding material cladded on another side surface of the core material in order of first cladding material/first internal brazing material/second sacrificial anode material/core material/second internal brazing material/second cladding material, wherein the second internal brazing material is formed of an aluminum alloy comprising 6.00 mass % to 13.00 mass % of Si, more than 0.50 mass % and 4.50 mass % or less of Mg, and 0.010 mass % to 0.50 mass % of Bi, and formed with the balance being Al and inevitable impurities, and the second cladding material is formed of an aluminum alloy comprising 6.00 mass % to 13.00 mass % of Si and more than 0.050 mass % and 0.50 mass % or less of Mg, having a Bi content of 1.00 mass % or less, and formed with the balance being Al and inevitable impurities.

13. The aluminum alloy brazing sheet according to claim 1, wherein the core material is formed of an aluminum alloy comprising any one or more of 1.50 mass % or less of Si, 1.50 mass % or less of Fe, 2.00 mass % or less of Cu, 2.00 mass % or less of Mn, 3.00 mass % or less of Mg, 3.00 mass % or less of Zn, 0.50 mass % or less of Bi, 0.30 mass % or less of Cr, 0.30 mass % or less of Ti, and 0.30 mass % or less of Zr, and formed with the balance being Al and inevitable impurities.

14. The aluminum alloy brazing sheet according to claim 1, wherein the first internal brazing material or the second internal brazing material further comprises any one or more of 1.00 mass % or less of Fe, 2.00 mass % or less of Cu, 2.00 mass % or less of Mn, 6.00 mass % or less of Zn, 0.30 mass % or less of Cr, 0.30 mass % or less of Ti, and 0.30 mass % or less of Zr.

15. The aluminum alloy brazing sheet according to claim 1, wherein the first cladding material or the second cladding material further comprises any one or more of 1.00 mass % or less of Fe, 2.00 mass % or less of Cu, 2.00 mass % or less of Mn, 6.00 mass % or less of Zn, 0.30 mass % or less of Cr, 0.30 mass % or less of Ti, and 0.30 mass % or less of Zr.

16. The aluminum alloy brazing sheet according to claim 1, wherein a thickness of the first cladding material or the second cladding material is 5.0 μm or more.

17. The aluminum alloy brazing sheet according to claim 1, wherein a thickness of the first internal brazing material or the second internal brazing material is 15.0 μm or more.

18. The aluminum alloy brazing sheet according to claim 1, wherein an average Mg concentration in a thickness direction of the first internal brazing material and the first cladding material is more than 0.50 mass % and an average Bi concentration in the thickness direction of the first internal brazing material and the first cladding material 4 is more than 0.050 mass %.

19. The aluminum alloy brazing sheet according to claim 1, wherein an average Mg concentration in a thickness direction of the second internal brazing material and the second cladding material is more than 0.50 mass % and an average Bi concentration in the thickness direction of the second internal brazing material and the second cladding material is more than 0.050 mass %.

\* \* \* \* \*